United States Patent
Dsaak et al.

(10) Patent No.: US 10,710,809 B2
(45) Date of Patent: Jul. 14, 2020

(54) TRANSPORTING DEVICE, VACUUM ARRANGEMENT, TRANSPORTING ROLLER AND METHOD

(71) Applicant: VON ARDENNE Asset GmbH & Co. KG, Dresden (DE)

(72) Inventors: Torsten Dsaak, Dresden (DE); Thomas Meyer, Dresden (DE); Michael Hofmann, Dresden (DE); Matthias Smolke, Dresden (DE); Jan Kircheis, Bannewitz (DE)

(73) Assignee: VON ARDENNE Asset GmbH & Co. KG, Dresden (DE)

( * ) Notice: Subject to any disclaimer, the term of this patent is extended or adjusted under 35 U.S.C. 154(b) by 0 days.

(21) Appl. No.: 16/218,538

(22) Filed: Dec. 13, 2018

(65) Prior Publication Data
US 2019/0185273 A1    Jun. 20, 2019

(30) Foreign Application Priority Data
Dec. 14, 2017 (DE) .......... 10 2017 129 952

(51) Int. Cl.
*B65G 39/04* (2006.01)
*B65G 39/09* (2006.01)
*B65G 13/02* (2006.01)

(52) U.S. Cl.
CPC ........... *B65G 39/04* (2013.01); *B65G 13/02* (2013.01); *B65G 39/09* (2013.01); *B65G 2201/022* (2013.01); *B65G 2207/22* (2013.01)

(58) Field of Classification Search
CPC ........ B65G 39/04; B65G 39/09; B65G 13/02; B65G 2201/022; B65G 2207/22

(Continued)

(56) References Cited

U.S. PATENT DOCUMENTS 3,763,533 A * 10/1973 Blom .............. C03B 35/181
492/40
3,847,260 A * 11/1974 Fowler ............... B65G 39/04
193/37

(Continued)

FOREIGN PATENT DOCUMENTS

DE    20 2011 001 479 U1    5/2011
DE    20 2011 003 708 U1    6/2011
DE    20 2014 006 663 U1    10/2014

OTHER PUBLICATIONS

German Search Report based on application No. 10 2017 129 952.1 (5 pages) dated Sep. 13, 2018 (for reference purpose only).

*Primary Examiner* — Mark A Deuble
(74) *Attorney, Agent, or Firm* — Viering, Jentschura & Partner mbB (57) ABSTRACT

According to various embodiments, a transporting device may comprise: a plurality of transporting rollers, of which at least two transporting rollers comprises: a glass tube mounted rotatably about an axis of rotation; the glass tube being joined together from a plurality of tube segments, a first tube segment of which is arranged between two second tube segments; and the first tube segment having a plurality of portions, the circumferential surfaces of which are surfaces of rotation with respect to the axis of rotation and/or are arranged coaxially; the plurality of transporting rollers providing by means of the circumferential surfaces a transporting surface for transporting a substrate in plate form and/or in strip form.

20 Claims, 4 Drawing Sheets

(58) Field of Classification Search
USPC .................. 193/37; 492/33–37, 40, 57, 59
See application file for complete search history.

(56) References Cited

U.S. PATENT DOCUMENTS

| | | | | |
|---|---|---|---|---|
| 3,964,658 | A * | 6/1976 | Edwards | B65H 27/00 |
| | | | | 226/190 |
| 4,352,230 | A * | 10/1982 | Sukenik | B21B 39/008 |
| | | | | 432/246 |
| 4,385,683 | A * | 5/1983 | Krupp | B65G 39/02 |
| | | | | 193/37 |
| 5,155,910 | A * | 10/1992 | Henseler | B05C 11/025 |
| | | | | 29/895.21 |
| 5,660,109 | A * | 8/1997 | Constantino | B41F 31/26 |
| | | | | 101/348 |
| 7,572,215 | B2 * | 8/2009 | Kayhan | B21B 27/035 |
| | | | | 492/39 |
| 2015/0044621 | A1 * | 2/2015 | Mosshammer | F27B 9/14 |
| | | | | 432/11 |
| 2018/0215550 | A1 * | 8/2018 | Roelfsema | B65G 13/07 |

\* cited by examiner

TRANSPORTING DEVICE, VACUUM ARRANGEMENT, TRANSPORTING ROLLER AND METHOD

This application claims priority to German Patent Application Serial No. 10 2017 129 952.1, which was filed Dec. 14, 2017, which is incorporated by reference herein.

The invention relates to a transporting device, a vacuum arrangement, a transporting roller and a method.

Generally, a substrate, for example a glass substrate, a metal substrate and/or a polymer substrate, can be treated (processed), for example coated or heat-treated, so that the chemical and/or physical properties of the substrate can be changed. For coating a substrate, various coating processes can be carried out. For example, a vacuum coating installation may be used in order to deposit a layer or a plurality of layers on a substrate or on a plurality of substrates by means of a chemical and/or physical vapor deposition. In order to realize depositing efficiently over a large area on substrates of a correspondingly large area, a so-called in-line installation may be used, in which a substrate is transported through the entire installation, for example by means of transporting rollers, while a coating process can be carried out in one or more regions of the in-line installation during the transport of the substrate through the in-line installation.

If the substrate is brought to high temperatures, it may be required to use transporting rollers made of glass. By way of illustration, glass has a low heat conduction, so that the thermal loading of the rotary bearings is less, which increases their service life, and/or the substrate is cooled down less.

Conventionally, a transporting roller made of glass is produced from a monolithic piece. This process is however restricted to a transporting roller of a small length and/or is only cost-effective for a small length. For example, the length of the tube drawing device and/or the length of the grinding installation may limit the maximum length that can be produced. As from a certain length of the transporting roller, it therefore becomes necessary and/or it is therefore more cost-effective to produce it from more than one part. For this purpose, conventionally precisely two tube segments are joined together, so that they are configured mirror-symmetrically with respect to the joint.

According to various embodiments, by way of illustration, it has been found that the conventional geometry with which the joined-together transporting roller made of glass is provided has a high risk of eccentricity, i.e. of not being exactly coaxial, axially parallel and/or in line. For example, the transporting roller may have a kink, for example "V"-shaped, and/or an offset, for example "Z"-shaped, at the joint. This has the effect that a substrate transported with it drifts transversely in relation to the transporting direction. The drifting substrate may for example hit other components of the chamber, which increases the risk of substrate breakage. If two substrates are transported next to one another, they may for example drift toward one another, which likewise increases the risk of substrate breakage.

Various embodiments provide a transporting device, a vacuum arrangement, a transporting roller and a method which provide less eccentricity (i.e. less deviation from round running) and can be produced more easily within the required production tolerances (for example for round running and/or concentricity). For example, the portion of the transporting roller that provides the bearing surface may be produced from (for example precisely) one single tube segment, and further tube segments may be joined onto this one segment in order to achieve the prescribed length. This achieves the effect that the substrates transported on the bearing surface drift less.

By way of illustration, it has been found that the production of a tube segment itself has a lower production tolerance than the joining together of two tube segments. It has been found in this connection that an eccentricity at a joint can be corrected more easily by compensating for it by means of a further joint than by deforming the tube itself.

By contrast with the conventional approach, in which the plurality of joints is minimized in order to achieve round running that is as exact as possible, according to various embodiments the plurality of joints is increased in order to achieve round running that is as exact as possible. By way of illustration, greater production effort is accepted, in that more tube segments are required, but as a result the production effort for maintaining production tolerances is reduced.

According to various embodiments, a transporting device may comprise: a plurality of transporting rollers (e.g. a number of transporting rollers), of which each (e.g. at least two) transporting roller comprises: a glass tube mounted rotatably about an axis of rotation; the glass tube being joined together from a plurality of tube segments, a first tube segment of which is arranged between two second tube segments; and the first tube segment having a plurality of portions (for example adjoining one another and/or spatially separate from one another) (for example at least two end portions), the circumferential surfaces of which are surfaces of rotation (also referred as to surfaces of revolution) with respect to the axis of rotation and/or are arranged coaxially; the plurality of transporting rollers providing by means of the circumferential surfaces a transporting surface for transporting a substrate in sheet form and/or in strip form.

Exemplary embodiments of the invention are represented in the figures and are explained in more detail below.

In the figures.

In the following detailed description, reference is made to the accompanying drawings, which form part of this description and in which specific embodiments in which the invention can be carried out are shown for purposes of illustration. In this respect, directional terminology such as for instance "at the top", "at the bottom", "at the front", "at the rear", "front", "rear", etc. is used with reference to the orientation of the figure(s) described. Since components of embodiments may be positioned in a plurality of different orientations, the directional terminology serves for purposes of illustration and is in no way restrictive. It goes without saying that other embodiments may be used and structural or logical changes may be made without departing from the scope of protection of the present invention. It goes without saying that the features of the various embodiments described herein by way of example can be combined with one another, unless otherwise specifically stated. The following detailed description is therefore not to be interpreted in a restrictive sense, and the scope of protection of the present invention is defined by the appended claims.

In the course of this description, the terms "connected" and "coupled" are used for describing both a direct connection and an indirect connection (for example ohmic and/or electrically conductive, for example an electrically conductive connection) and a direct coupling or indirect coupling. In the figures, identical or similar elements are provided with identical designations, wherever appropriate.

According to various embodiments, the term "coupled" or "coupling" may be understood in the sense of a (for example mechanical, hydrostatic, thermal and/or electrical), for example direct or indirect, connection and/or interaction. A plurality of elements may for example be coupled to one another along a chain of interaction. According to various embodiments, "coupled" may be understood in the sense of a mechanical (for example physical) coupling, for example by means of a direct physical contact. A coupling may be configured to transmit a mechanical interaction (for example force, torque, etc.).

According to various embodiments, a transporting roller described herein may have at least one of the following properties and/or meet one of the following requirements:
- mechanically and/or thermally stable up to at least 700° C.;
- better to clean;
- poor heat conduction in the axial direction;
- low desorption;
- easier to produce; and/or
- greater round running accuracy.

According to various embodiments, a transporting roller described herein may be used and/or arranged for transporting a substrate and/or in a processing arrangement (for example a vacuum coating installation) in which a temperature is produced in a range from approximately 20° C. to approximately 600° C. (degrees Celsius), for example the substrate may be brought to the temperature. The temperature may for example be greater than approximately 100° C. (for example greater than approximately 200° C., for example greater than approximately 300° C., for example greater than approximately 400° C., for example greater than approximately 500° C.) and/or less than approximately 1000° C. (for example less than approximately 900° C., for example less than approximately 800° C., for example less than approximately 700° C., for example less than approximately 600° C.)

According to various embodiments, a transporting roller described herein may have at least one of the following properties and/or meet one of the following requirements:
- made up of more than one part (by way of illustration, to overcome the length limitation in producibility);
- single parts (for example tube segments) welded to one another, for example welded to one another after their machining;
- divided at least or precisely into three (by way of illustration, to improve the round-running properties, for example statistically);
- produced from a glass material;
- a poor heat conduction in the axial direction;
- a low desorption rate;
- a high temperature resistance; and/or
- a high mechanical and/or chemical stability (for example wet-chemical and/or dry-ice cleaning of the transporting roller is possible).

According to various embodiments, glass may be understood as a substantially amorphous solid, i.e. a material in the solid state that has an amorphous microstructure or is formed therefrom. For example, the glass may comprise an amorphous volume fraction of more than 75% (volume percent), for example of more than approximately 80%, for example of more than approximately 90%, for example of more than approximately 95%. Depending on the type of glass and the processing temperature, the glass may optionally comprise (for example ceramic and/or oxidic) foreign phases, such as for example crystallites, inclusions and/or precipitates.

The glass may for example comprise a silica-based glass (comprising silicon dioxide or formed therefrom) or some other glass material (for example comprising aluminum oxide or formed therefrom) or be formed therefrom. For example, the glass may comprise aluminum, silicon and/or magnesium or be formed therefrom, for example an oxide of these (for example silicon dioxide). The glass may for example have a thermal conductivity of less than approximately 10 W/(K·m) (watts per meter and Kelvin), for example less than approximately 5 W/(K·m), for example less than approximately 2 W/(K·m), for example less than approximately 1 W/(K·m).

According to various implements, the glass and/or the glass tube may be light-transmissive (i.e. transparent). Alternatively or in addition, the glass and/or the glass tube may have a greater transmittance than absorbance. This can make it possible that the glass tube absorbs heat radiation, i.e. is heated, as little as possible. A light-transmissive substance (material), structure or body may have a transmittance that is greater than approximately 50%, for example greater than approximately 60%, for example greater than approximately 70%, for example greater than approximately 80%, for example greater than approximately 90%. For example, the transmittance may lie in a range from approximately 70% to approximately 99%. By analogy with this, a light-nontransmissive substance (material), structure or body may have a transmittance that is less than approximately 50%, for example less than approximately 40%, for example less than approximately 30%, for example less than approximately 20%, for example less than approximately 10%. For example, the transmittance may lie in a range from approximately 0% to approximately 20%.

If, by way of illustration, a heat emission that is as high as possible is required, the glass and/or the glass tube may be light-nontransmissive and/or roughened. Alternatively or in addition, the glass and/or the glass tube may have a lower transmittance than absorbance. For this purpose, pigments (for example a color-imparting substance and/or particles) for example may be introduced into and/or applied to the glass and/or glass tube. The pigments (for example particles) may optionally comprise a carbon modification, such as for example carbon black or graphite, or a dye or be formed therefrom. Alternatively or in addition, the pigments may be light-nontransmissive.

For example, the first tube segment and/or the two second tube segments may comprise a large number of pigments and/or have a greater transmission coefficient than absorption coefficient.

The terms "light-transmissive", "light-nontransmissive" and "light-reflective" may be understood within the scope of this description with respect to at least one wavelength range of electromagnetic radiation, for example in at least a range of visible light, for example in a wavelength range of approximately 380 nm to 780 nm (nanometers), and/or heat radiation, for example in a wavelength range from approximately 780 nm to 50 µm (micrometers). For example, the first tube segment and/or the two second tube segments may be transparent and/or have a lower transmission coefficient than absorption coefficient.

According to various embodiments, thermally insulating, for example with respect to a material, a connection and/or a body, may be understood as meaning having a thermal conductivity of less than approximately 10 W/(m·K) (watts per meter and Kelvin), 8 W/(m·K), 4 W/(m·K), 2 W/(m·K), 1 W/(m·K), 0.5 W/(m·K) or 0.1 W/(m·K). According to various embodiments, thermally conductive, for example with respect to a material, a connection and/or a body, may be understood as meaning having a thermal conductivity of more than 10 W/(m·K), 20 W/(m·K), 50 W/(m·K), 100 W/(m·K), 200 W/(m·K) or 300 W/(m·K).

Figure 1A:
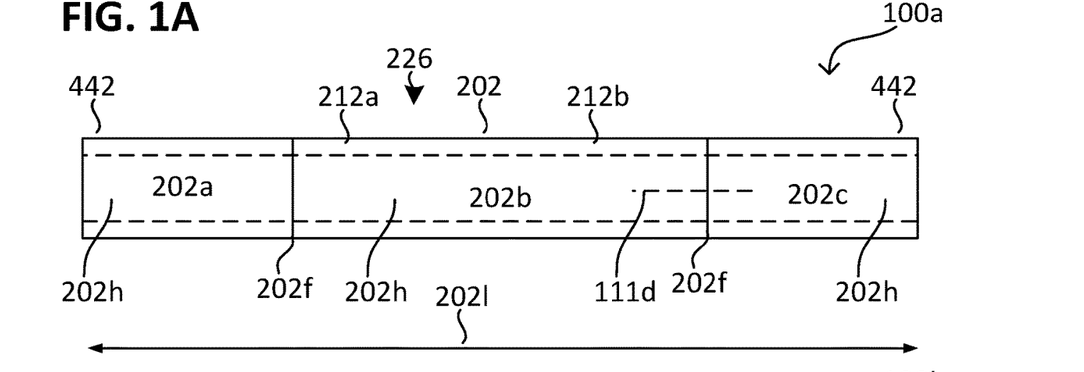
FIGS. 1A, 1B and 1D show a transporting roller according to various embodiments in a schematic side view or cross-sectional view.

FIG. 1A illustrates a transporting roller 100a according to various embodiments in a schematic side view or cross-sectional view (for example taken in section along the axis of rotation 111d).

The transporting roller 100a may comprise a glass tube 202 or be formed therefrom. The glass tube 202 may comprise a plurality of tube segments 202a, 202b, 202c or be formed therefrom, for example at least three (i.e. precisely three or more than three) tube segments 202a, 202b, 202c. The glass tube 202 may for example comprise at least one first tube segment 202b, at least one second tube segment 202a and at least one third tube segment 202c or be formed therefrom. The first tube segment 202b may be arranged between the second tube segment 202a and the third tube segment 202c (also referred to as two second tube segments), adjoin these and/or be held by them. Optionally, at least one (i.e. precisely one or more than one) additional tube segment of the plurality of tube segments may be arranged between the first tube segment 202b and the second and/or third tube segment 202a, 202c. For example, the plurality of tube segments may comprise more than three tube segments.

Optionally, tube segments directly neighboring one another or all of the tube segments of the plurality of tube segments 202a, 202b, 202c may form a unitary hollow body, i.e. have a unitary cavity 202h. The cavity 202h may for example extend along an axis of rotation 111d of the transporting roller 100a through at least one (i.e. precisely one, more than one or each) tube segment of the plurality of tube segments 202a, 202b, 202c. For example, the entire glass tube 202 may be a hollow body, i.e. be penetrated by the cavity 202h along the axis of rotation 111d. The cavity 202h may for example extend along the axis of rotation 111d of the transporting roller 100a between two end portions 442b of the glass tube 202 through the latter and/or be open at the end portions 442b.

Optionally, tube segments directly neighboring one another or all of the tube segments of the plurality of tube segments 202a, 202b, 202c may comprise a (for example hollow-formed) circular cylinder or be formed therefrom. Alternatively or in addition, at least the second and/or the third tube segment 202a, 202c may comprise a (for example hollow-formed) circular cylinder or be formed therefrom.

The tube segments directly neighboring one another and/or adjoining one another of the plurality of tube segments 202a, 202b, 202c may be joined together, for example undetachably and/or in a material-bonded manner. Joining can be understood in production engineering as meaning that two or more solid bodies, for example of a geometrically defined shape, are permanently and/or undetachably connected (joined) to one another. The bodies are also referred to in this context as parts being joined.

Between tube segments directly neighboring one another and/or adjoining one another of the plurality of tube segments 202a, 202b, 202c, the glass tube 202 may in each case comprise a joining region 202f (for example joint 202f). The joining region 202f may refer to that region at which the tube segments are joined together, i.e. connected to one another.

At the joining region 202f, the tube segments directly neighboring one another and/or adjoining one another of the plurality of tube segments 202a, 202b, 202c go over into one another. For example, the joining region 202f may have a steady gradient in a material property (for example the chemical composition) and/or the wall thickness of the tube segments.

Optionally, the glass tube 202, for example the first tube segment 202b, at or near the joining region 202f may differ from another region next to the joining region 202f, for example in at least one of the following material properties: a chemical composition, a spatial density of crystallites, an average volume of the crystallites, a microstructure, the ratio of amorphous volume to crystalline (for example monocrystalline or polycrystalline) volume and/or the plurality of inclusions.

Optionally, tube segments directly neighboring one another and/or adjoining one another of the plurality of tube segments 202a, 202b, 202c may coincide in their chemical composition.

The tube segments directly neighboring one another and/or adjoining one another of the plurality of tube segments 202a, 202b, 202c may for example be welded together. Then, the joining region 202f may for example comprise a welded connection (for example a weld seam) or be formed therefrom. Welding may be understood as meaning undetachably connecting the tube segments by applying heat and/or pressure, for example optionally by partially melting the tube segments (parts being joined).

The glass tube 202 and/or the first tube segment 202b of the transporting roller 100a may have a longitudinal extent 2021 of more than approximately 2 m (meters), for example more than approximately 2.5 m. Alternatively or in addition, the glass tube 202 and/or the first tube segment 202b of the transporting roller 100a may have a diameter of more than approximately 50 mm (millimeters), for example more than approximately 80 mm and/or in a range from approximately 50 mm to approximately 150 mm.

Optionally, the circumferential surface of the first tube segment 202b may have a greater roughness than the circumferential surface of the second tube segment 202a and/or of the third tube segment 202c.

Joined together, the glass tube 202 may, by way of illustration, have a low eccentricity. For example, the first tube segment 202b, for example its circumferential surface and/or axis (for example axis of rotational symmetry), may have with respect to the second tube segment 202a and/or the third tube segment 202a, for example its circumferential surface and/or axis (for example axis of rotational symmetry), an eccentricity of less than approximately 0.5 mm, for example of less than approximately 0.25 mm, for example of less than approximately 0.2 mm, for example of less than approximately 0.1 mm, for example of less than approximately 0.05 mm, for example of less than approximately 0.01 mm. Alternatively or in addition, joined together, it may, by way of illustration, have a low tilting (i.e. angular deviation from one another). For example, the first tube segment 202b, for example its circumferential surface and/ or axis (for example axis of rotational symmetry), may have with respect to the second tube segment 202a and/or the third tube segment 202a, for example its circumferential surface and/or axis (for example axis of rotational symmetry), a tilting of less than approximately 0.5 degrees, for example of less than approximately 0.25 degrees, for example of less than approximately 0.2 degrees, for example of less than approximately 0.1 degrees, for example of less than approximately 0.05 degrees, for example of less than approximately 0.01 degrees. In other words, they may be substantially in line (also referred as to aligned) with one another and/or substantially axially parallel.

The first tube segment 202b may comprise a plurality of portions 212a, 212b (for example two, three, four, five, six, seven, eight, nine, ten or more than ten), the circumferential surfaces 226 of which provide a bearing surface for bearing a substrate on them. At least two portions 212a, 212b and/or portions 212a, 212b that are respectively directly neighboring one another of the plurality of portions may for example adjoin one another and/or each portion of the two portions 212a, 212b (for example end portion) may for example adjoin one of the two second tube segments 202a, 202c. The plurality of portions 212a, 212b may for example be configured geometrically and/or structurally identically and/or be connected monolithically to one another, so that, by way of illustration, they form for example a (for example homogeneous and/or contiguous) unitary cylindrical circumferential surface.

Figure 1B:
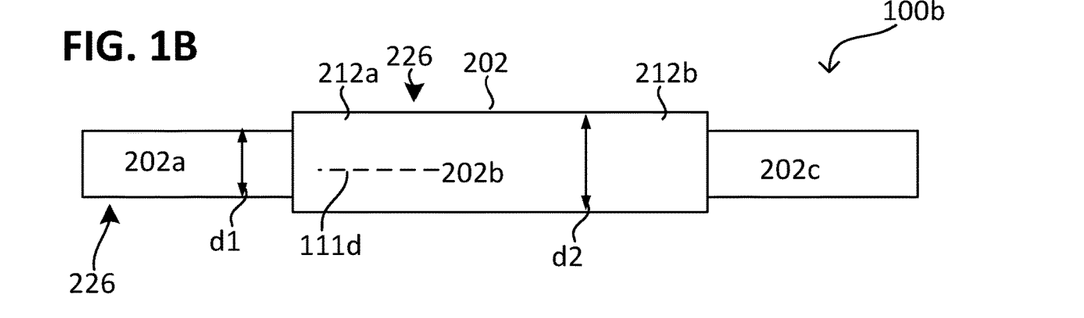

FIG. 1B illustrates a transporting roller 100b according to various embodiments in a schematic side view or cross-sectional view (for example taken in section along the axis of rotation 111d).

The transporting roller 100b may be configured like the transporting roller 100a, with the difference that it comprises a plurality of tube segments (i.e. at least two) that differ in their diameter.

The transporting roller 100b may have at the second tube segment 202a and/or the third tube segment 202c a second diameter d1, for example second outer diameter d1. For example, the second tube segment 202a and/or the third tube segment 202c may have the second diameter d1, for example second outer diameter d1. The transporting roller 100b may have at the first tube segment 202b a first diameter d2, for example first outer diameter d2. For example, the first tube segment 202b may have the first diameter d2, for example first outer diameter d2 (for example equal to the bearing diameter d4).

The second diameter d1 and/or the first diameter d2 may for example be more than approximately 50 mm, for example more than approximately 80 mm and/or be in a range from approximately 50 mm to approximately 150 mm.

Optionally, the circumferential surface defined by the first diameter d2 may have a greater roughness than the circumferential surface defined by the second diameter d1 (also referred to as the lateral surface).

The outer diameter of a body or portion may be understood as meaning the diameter of that (smallest-possible) circular cylinder in which the body or portion can be accommodated (i.e. that circular cylinder lying externally against the body that just still envelops the body). For example, the circular cylinder and the body (for example its contour), projected along the cylinder axis of the circular cylinder, may have at least three points of contact. In comparison thereto, the inner diameter may be understood as meaning the diameter of that (greatest-possible) circular cylinder which can be accommodated within the surface of the body or portion (i.e. the circular cylinder that is just still enveloped by the body).

As a difference from the transporting roller 100a, the first diameter d2 of the transporting roller 100b may be greater than the second diameter d1 of the transporting roller 100b. For example, the first diameter d2 of the transporting roller 100a may be equal to the second diameter d1 of the transporting roller 100a.

Figure 1C:
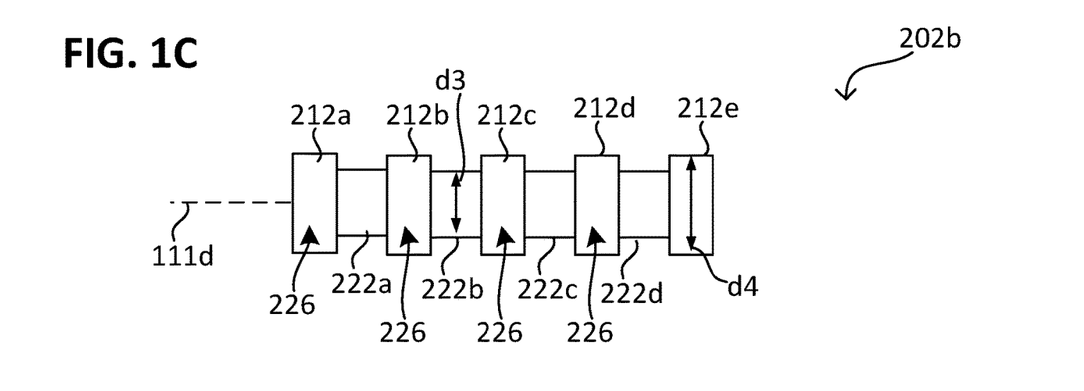
FIG. 1C shows a tube segment according to various embodiments in a schematic side view or cross-sectional view.

FIG. 1C illustrates the first tube segment 202b, for example in the transporting roller 100a or transporting roller 100b, according to various embodiments in a schematic side view or cross-sectional view (for example taken in section along the axis of rotation 111d).

The first tube segment 202b may comprise a plurality of portions 212a to 212e (for example two, three, four, five, six, seven, eight, nine, ten or more than ten), the circumferential surfaces 226 of which provide a bearing surface for bearing a substrate on them.

The circumferential surfaces 226 of portions directly neighboring one another or all of the portions of the plurality of portions 212a to 212e may be arranged coaxially in relation to one another, for example in line with one another and/or axially parallel. Alternatively or in addition, the circumferential surfaces 226 of portions directly neighboring one another or all of the portions of the plurality of portions 212a to 212e may be surfaces of rotation with respect to the axis of rotation 111d of the transporting roller. For example, portions directly neighboring one another or all of the portions of the plurality of portions 212a to 212e (also referred to as bearing portions 212a to 212e) may comprise a circular cylinder or be formed therefrom and have the outer diameter d4 (also referred to as the bearing diameter d4). The bearing diameter d4 may for example be equal to the first outer diameter d2.

Optionally, portions directly neighboring one another of the plurality of bearing portions 212a to 212e may be at a distance from one another. These may for example be spatially separated from one another by means of additional portions 222a to 222d (also referred to as separating portions 222a to 222d).

Optionally, the first tube segment 202 may comprise a plurality of portions 222a, 212a (for example directly neighboring one another and/or adjoining one another) that differ in their diameter d3, d4, for example outer diameter d3, d4. For example, the first tube segment 202 may comprise a plurality of additional portions 222a to 222d (also referred to as separating portions 222a to 222d), of which each portion is arranged between portions directly neighboring one another of the plurality of bearing portions 212a to 212e. Portions directly neighboring one another and/or all of the portions of the plurality of separating portions 222a to 222d may have a diameter d3 (also referred to as the separating diameter d3), for example outer diameter d3, that is less than the bearing diameter d4.

Portions 222a, 212a directly neighboring one another and/or adjoining one another that differ in their diameter d3, d4 may form a pair of portions. Optionally, the tube segment 202 may comprise a plurality of pairs of portions (for example two, three, four, five, six, seven, eight, nine, ten or more than ten).

The pluralitys of separating portions 222a to 222d reduce the contact area with the substrate, and consequently the loading acting on it. As an alternative to this, the separating portions 222a to 222d may be omitted. Then, portions directly neighboring one another of the plurality of bearing portions 212a to 212e may adjoin one another, as illustrated in FIG. 1A and FIG. 1b.

Optionally, the circumferential surface 226 (also referred to as the peripheral surface) of at least one portion of the plurality of bearing portions 212a to 212e may have a greater roughness than the circumferential surface 226 of at least one portion of the plurality of separating portions 222a to 222d.

Figure 1D:
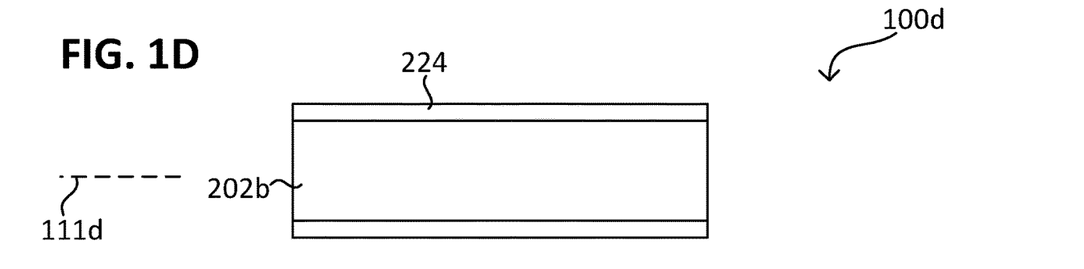

FIG. 1D illustrates a transporting roller 100d according to various embodiments in a schematic side view or cross-sectional view (for example taken in section along the axis of rotation 111d). The transporting roller 100d may be configured like the transporting roller 100a or transporting roller 100b and also comprise a sleeve 224, which surrounds at least the first tube segment 202b. The sleeve 224 makes it possible to protect the substrate.

Optionally, the second tube segment 202a and/or the first tube segment 202b may also extend at least sectionally (e.g., in certain portions) into the sleeve 224.

The sleeve 224 may for example comprise a plurality of filaments or be formed therefrom. The plurality of filaments may for example be arranged in the form of a knitted, braided or woven fabric or a mesh. Alternatively or in addition, the plurality of filaments may comprise a metal or be formed therefrom, for example steel. For example the sleeve 224 may comprise a metal woven fabric, metal knitted fabric and/or metal braided fabric or be formed therefrom.

FIG. 2A to FIG. 2D illustrate a tube wall of a transporting roller according to various embodiments in a schematic cross-sectional view (for example taken in section along the axis of rotation 111d), for example of the transporting roller 100a, 100b or transporting roller 100d. In other words, a partial cross-sectional view of the transporting roller is illustrated.

Figure 2A:
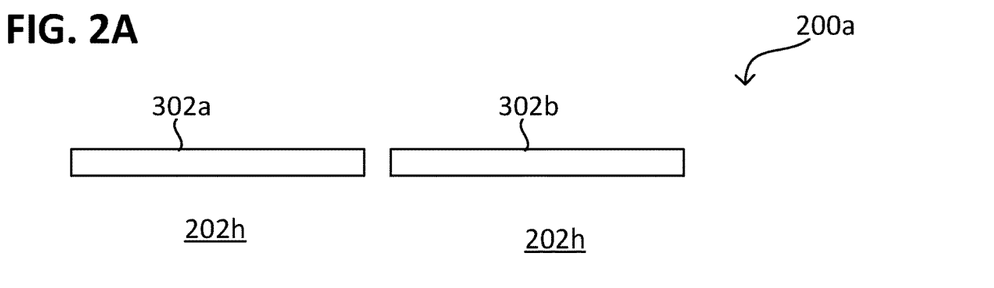
FIGS. 2A to 2D show a transporting roller according to various embodiments in a schematic side view or cross-sectional view.

For production (cf. view 200a, in which one side of the tube wall is illustrated), two tube segments 302a, 302b that are later intended to be part of the glass tube are provided. The two tube segments 302a, 302b may for example comprise the second tube segment 202a and the first tube segment 202b or the third tube segment 202b and the first tube segment 202b or be formed therefrom.

Figure 2B:
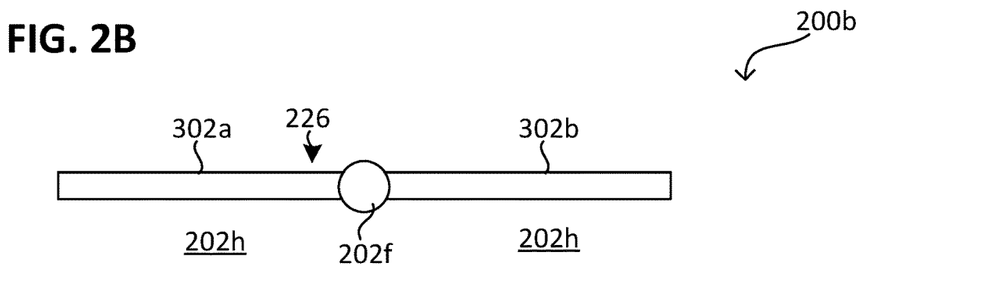

The two tube segments 302a, 302b may be joined together in a joining region 202f (cf. view 200b, in which one side of the tube wall is illustrated). For this purpose, the end portions abutting one another of the two tube segments 202a, 202b may be at least partially melted (i.e. transformed into a flowable state). Alternatively or in addition, molten material may be added to the end portions abutting one another of the two tube segments 302a, 302b. In the joining region 202f, the end portions of the two tube segments 302a, 302b and optionally the additional material may be mixed with one another and/or chemically bonded to another (for example by means of covalent bonds).

Figure 2C:
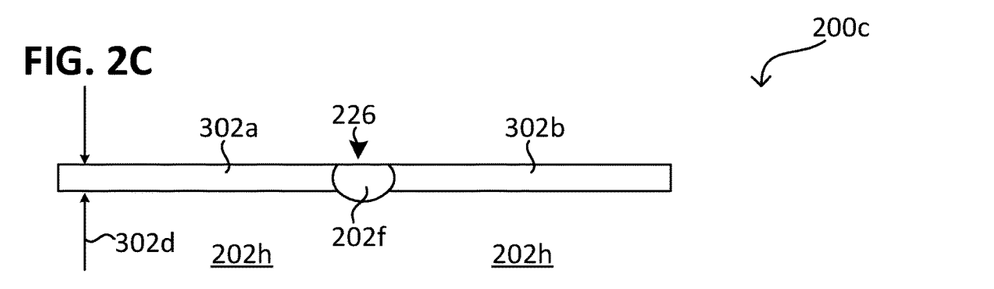
Figure 2D:
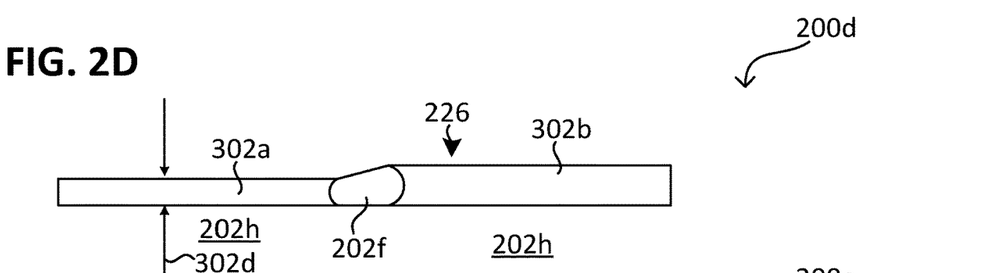

Optionally (cf. views 200c and 200d, in which one side of the tube wall is illustrated), the joining region 202f may be planarized, for example by means of grinding.

The planarizing may be performed for example in such a way that the glass tube 202 has at the joining region 202f (i.e. between the two tube segments) a cylindrical, for example continuous, offset-free and/or steady, transition of the circumferential surface 226. For example (cf. view 200c), at the joining region 202f the circumferential surface 226 may be in line with the circumferential surface 226 on the two tube segments 202a, 202b. Alternatively or in addition, the wall thickness 302d at the joining region 202f may coincide with the wall thickness 302d (also referred to as the tube wall thickness) at the two tube segments 202a, 202b.

Figure 2E:
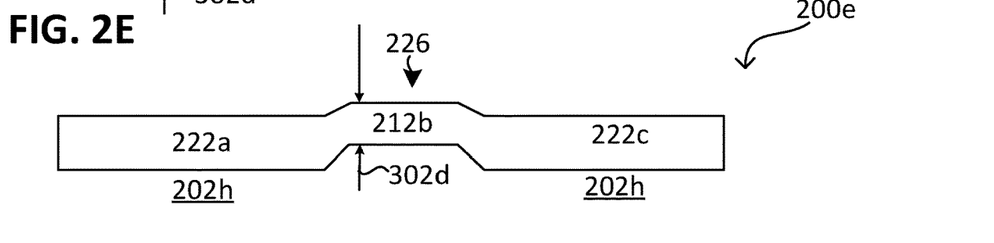
FIG. 2E shows a tube segment according to various embodiments in a schematic view of a detail.

Alternatively (cf. view 200e, in which one side of the tube wall is illustrated), the circumferential surface 226 may have at the joining region 202f a conical transition, for example providing a transition between different outer diameters and/or between different wall thicknesses 302d at the two tube segments 202a, 202b.

For example, the wall thicknesses 302d of the glass tube 202, for example at the two tube segments 202a, 202b, may be in a range from approximately 6 mm to approximately 10 mm.

According to various embodiments, the glass tube and/or each of its tube segments may comprise glass (for example quartz glass, borosilicate glass and/or aluminum oxide glass) or be formed therefrom.

FIG. 2E illustrates the first tube segment 202b according to various embodiments in a schematic view of a detail, for example the tube segment 202b of the transporting roller 100a, 100b or 100d. According to various embodiments, the tube wall of the tube segment 202b in at least one (i.e. precisely one, more than one or each) bearing portion 212a of the plurality of bearing portions 212a may be protruding and/or be smaller.

Figure 3A:
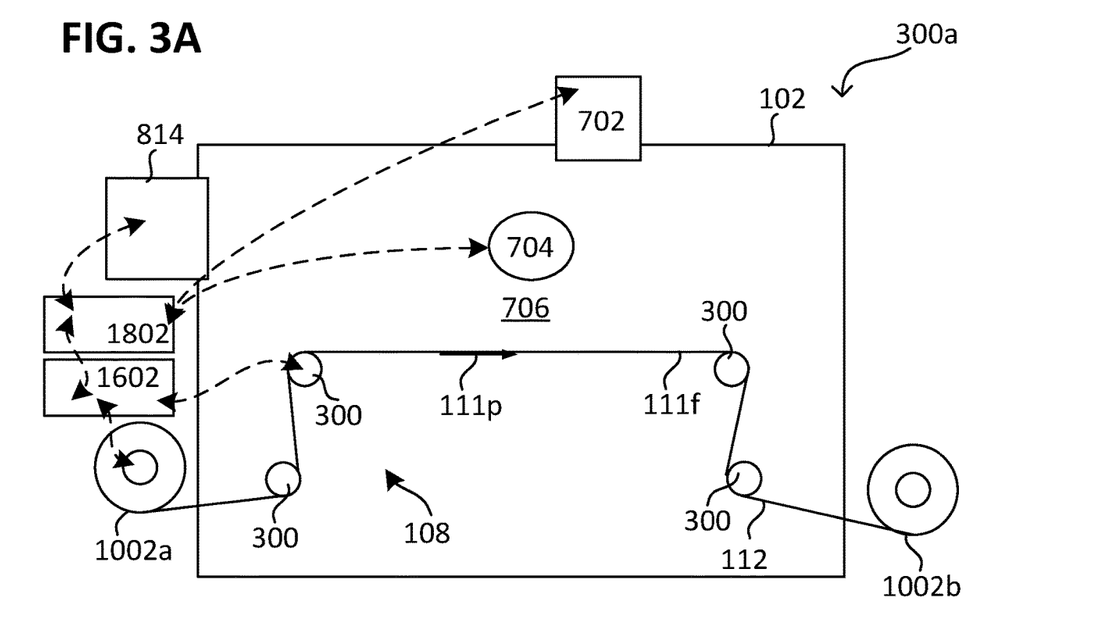
FIGS. 3A and 3B respectively show a vacuum arrangement according to various embodiments in a schematic cross-sectional view or side view.
Figure 3B:
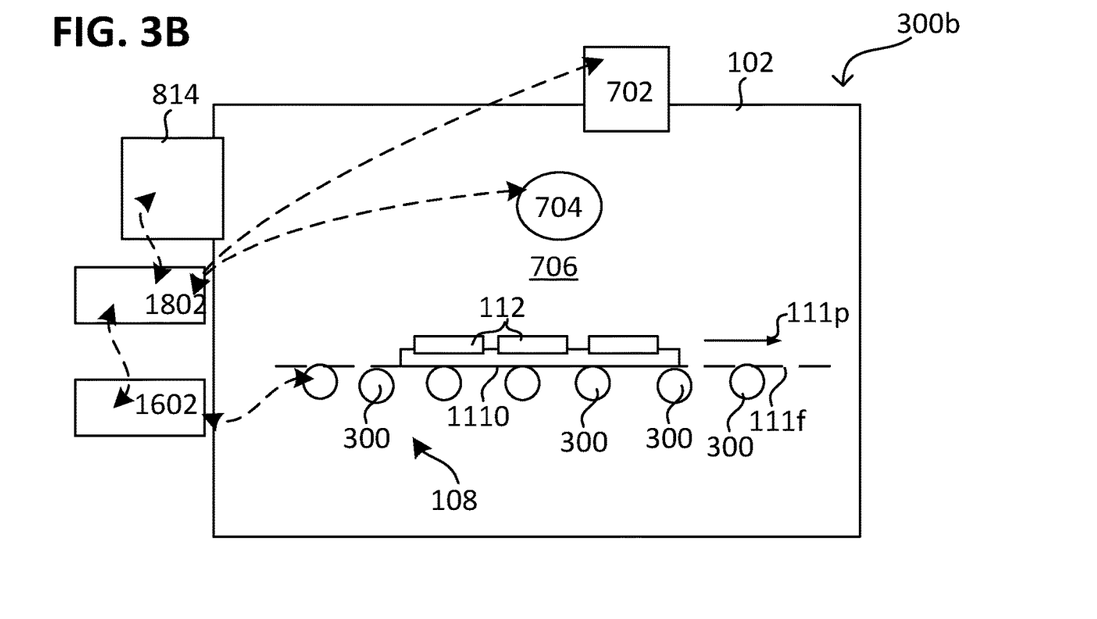

FIG. 3A and FIG. 3B respectively illustrate a vacuum arrangement 300a, 300b (also referred to as a vacuum processing arrangement) according to various embodiments in a schematic cross-sectional view or side view.

According to various embodiments, a vacuum arrangement 300a, 300b may comprise a vacuum chamber 102, for example in order to coat a substrate 112 by means of a coating process therein. Furthermore, the vacuum arrangement 300a, 300b may comprise a transporting device 108 for transporting a substrate 112 along a transporting path 111p through the vacuum chamber 102. Furthermore, the vacuum arrangement 300a, 300b may comprise a processing source 704, for example a coating material source. The processing source 704 may for example be configured for emitting at least one coating material in the direction of the transporting path 111p and/or the transporting surface 111f.

The vacuum chamber 102 may be provided by means of the chamber housing. The vacuum chamber 102 may be configured to produce and/or maintain a vacuum therein. For example, the vacuum arrangement 300a, 300b may comprise a plurality of vacuum chambers, of which for example two vacuum chambers that are respectively directly neighboring one another adjoin one another. The plurality of vacuum chambers 102 may be connected to one another by means of a substrate transfer opening, so that they form for example a unitary vacuum system. The vacuum system may be sealed from the outside in a substantially airtight manner, for example by means of at least one valve, at least one chamber cover and/or at least one transfer opening flap.

According to various embodiments, the vacuum arrangement 300a, 300b may comprise a vacuum pump arrangement 814 (comprising at least one main vacuum pump and/or a roughing pump). The vacuum pump arrangement 814 may be configured to extract a gas (for example a process gas) from the vacuum chamber 102, so that a vacuum (i.e. a pressure lower than 0.3 bar) and/or a pressure in a range from approximately $10^{-3}$ millibars (mbar) to approximately $10^{-7}$ mbar (in other words a high vacuum) or a pressure lower than a high vacuum, for example lower than approximately $10^{-7}$ mbar (in other words an ultrahigh vacuum) can be provided within the vacuum chamber 102. The process gas may comprise a working gas and optionally a reactive gas or a gas mixture of a plurality of working gases and a plurality of optional reactive gases.

According to various embodiments, the vacuum arrangement 300a, 300b may comprise the control device 1802, which is coupled to one or more component parts of the vacuum arrangement 300a, 300b (represented by dashed lines) for controlling the operating point in the vacuum chamber 102 in an open-loop and/or closed-loop manner. For example, the vacuum chamber 102 may be configured in such a way that the operating point (process conditions) within the vacuum chamber 102 (for example the process pressure, process temperature, chemical composition of the process gas, etc.) can be set or controlled, for example during the coating, for example by means of the control device 1802.

According to various embodiments, the vacuum arrangement 300a, 300b may comprise a gas supply 702. By means of the gas supply 702, the vacuum chamber 102 can be fed a process gas for forming a process atmosphere in the vacuum chamber 102. The process pressure may be formed by an equilibrium of process gas that is fed in by means of the gas supply 702 and is extracted by means of the vacuum pump arrangement 814.

According to various embodiments, the reactive gas may comprise at least one of the following: hydrogen, water (in gas form, for example water vapor), oxygen, nitrogen, hydrogen sulfide, methane, gaseous hydrocarbons, fluorine, chlorine, or some other gaseous material. Alternatively or in addition, the working gas may comprise an inert gas or be formed therefrom, such as for example a noble gas, for example argon. The reactive gas may have a higher chemical reactivity than the working gas, for example with respect to the coating material.

For example, by means of the control device 1802 the gas supply 702 and/or the vacuum pump arrangement 814 may be controlled in an open-loop and/or closed-loop manner, for example according to a target operating point. The target operating point may in this case represent for example a parameter of the atmosphere within the vacuum chamber 102 (i.e. of the process atmosphere), for example its chemical composition, pressure and/or spatial distribution.

Alternatively or in addition, the control device 1802 may be configured for controlling the coating operation in an open-loop and/or closed-loop manner, for example according to the target operating point. The target operating point may in this case represent for example a target operating parameter of the coating material source 704 (for example the target consumed electrical power, the target applied electrical voltage, the target consumed electrical current and/or the target emission rate).

According to various embodiments, the vacuum arrangement 300a may comprise a transporting device 108 (also referred to as a substrate transporting device 108). According to various embodiments, the transporting device 108 of the vacuum arrangement 300a may comprise an unwinding roller 1002a for unwinding a substrate in strip form 112 in the direction of the coating region 706. Furthermore, the transporting device 108 of the vacuum arrangement 300a may comprise a winding-up roller 1002b for winding up the substrate in strip form 112 that is transported from the direction of the coating region 706.

A substrate in strip form 112 (strip substrate) may be a sheet, a nonwoven, a strip and/or a woven fabric or be formed therefrom. For example, a substrate in strip form 112 may comprise a metal strip, a metal sheet, a plastic strip (polymer strip) and/or a plastic sheet (polymer sheet) or be formed therefrom. According to various embodiments, the strip substrate 112 may comprise any desired material or be formed therefrom, for example a metal, a semimetal, a polymer, a glass, or any other material that can be processed with an appropriately small material thickness (thickness) and/or as fibers by means of rollers 300 or rolls 300. By way of illustration, a strip substrate may be any desired substrate 112 that can be wound up onto a roller 1002a, 1002b and/or unwound and/or for example can be processed from roller to roller. Depending on the material, a strip substrate 112 may have a thickness in a range from approximately several micrometers (for example of approximately 1 µm) to approximately several millimeters (for example up to approximately 10 mm).

According to various embodiments, the substrate transporting device 108 of the vacuum arrangement 300a may comprise a multiplicity of (e.g. at least two, e.g. at least 3, e.g. at least 4, e.g. at least 5, e.g. at least 7, e.g. at least 10, e.g. at least 20, e.g. at least 50) transporting rollers 300, which define a (for example singly or multiply curved) transporting path 111p (or a correspondingly singly or multiply curved transporting surface 111f), along which the substrate in strip form 112 is transported between the unwinding roller 1002a and the winding-up roller 1002b past the plasma-forming region 106.

As an alternative to this, the transporting device 108 of the vacuum arrangement 300b may comprise a multiplicity of transporting rollers 300, which are configured for transporting a substrate in plate form 112. The substrate in plate form 112 may be transported for example while lying on the transporting rollers 300 and/or while placed in a substrate carrier 1110.

The transporting rollers 300 may for example be configured like the transporting roller 100a, 100b or 100d.

Furthermore, the vacuum arrangement 300a, 300b may comprise a transporting drive 1602, which is coupled at least to some of the multiplicity of transporting rollers 300 and optionally to the unwinding roller 1002a and the winding-up roller 1002b. For example, the transporting drive 1602 may be coupled to the rollers 300, 1002a, 1002b by means of chains, belts or gearwheels. The transporting rollers 300 and the transporting drive 1602 may be part of the substrate transporting device 108.

Optionally, the control device 1802 may be configured for controlling the transporting drive 1602 in an open-loop and/or closed-loop manner. For example, by means of the control device 1802, a transporting operating parameter (for example a transporting speed, a substrate position, a substrate through-flow, etc.) may be controlled in an open-loop and/or closed-loop manner, for example according to the target operating point of the reaction mode, which for example represents a target transporting state.

Figure 4:
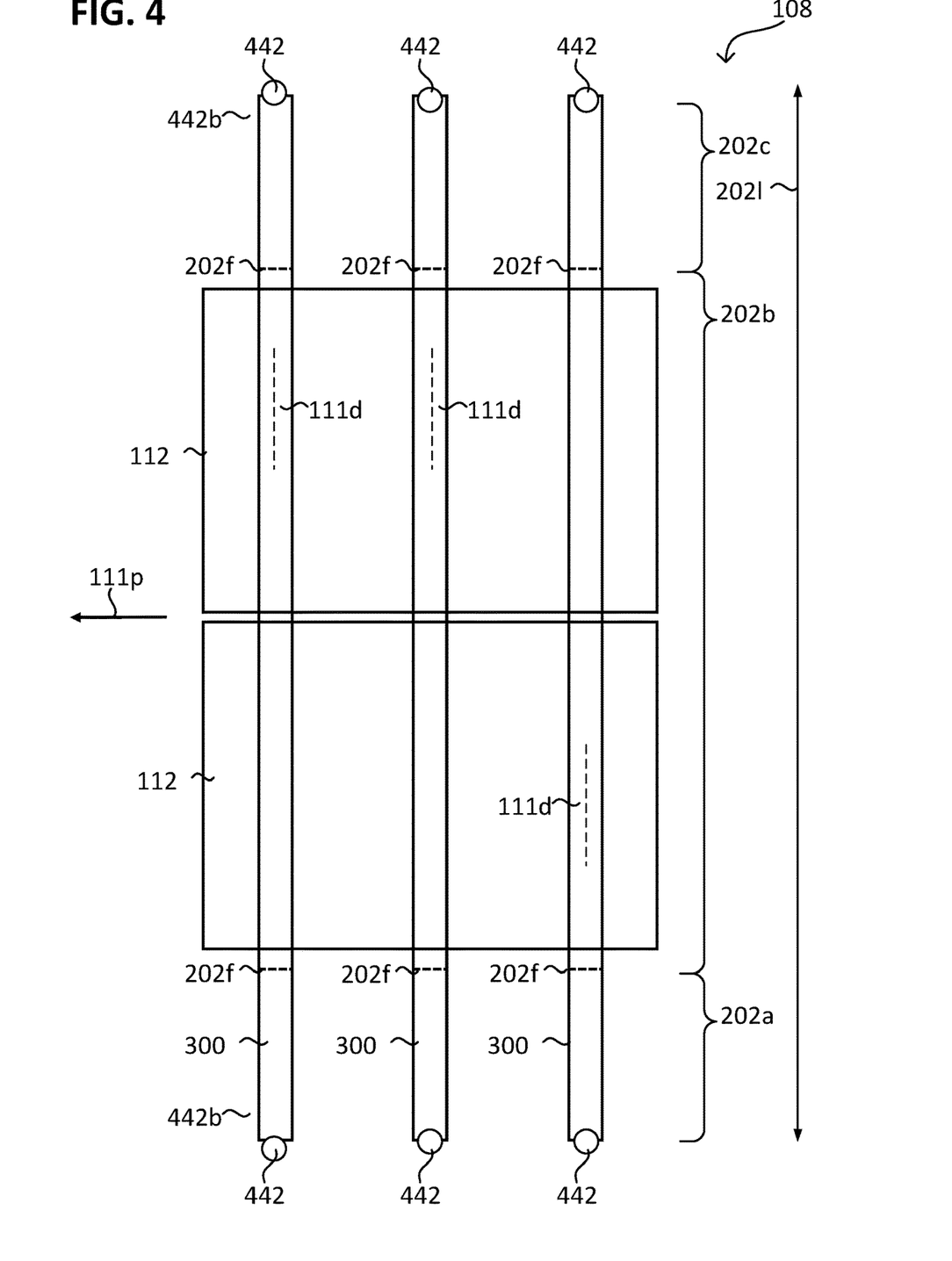
FIG. 4 shows a transporting device according to various embodiments in a schematic plan view.

FIG. 4 illustrates a transporting device 108 according to various embodiments in a schematic plan view (for example with the direction of viewing perpendicular to the transporting surface).

The transporting device 108 may comprise a plurality of e.g. at least 3, e.g. at least 4, e.g. at least 5, e.g. at least 7, e.g. at least 10, e.g. at least 20, e.g. at least 50) transporting rollers 300 (for example transporting rollers 100a, 100b or 100d) of which each (e.g., the at least 2, e.g. at least 3, e.g. at least 4, e.g. at least 5, e.g. at least 7, e.g. at least 10, e.g. at least 20, e.g. at least 50) comprises a glass tube 202 or is formed therefrom.

The glass tube 202 of each transporting roller of the plurality of transporting rollers 300 may be mounted rotatably about the axes of rotation at end portions 442b lying opposite one another (for example bearing portions 442b), for example by means of respective rotary bearings 442. The rotary bearings 442 may be part of a rotary bearing arrangement. The rotary bearing arrangement may optionally be configured in such a way that the axis of rotation of each transporting roller of the plurality of transporting rollers 300 lies in a planar plane.

Optionally, the two rotary bearings 442 of at least one (for example each) transporting roller of the plurality of transporting rollers 300 may have an axial tilt (i.e. angular deviation of the axes of rotation) of less than approximately 0.5 degrees, for example of less than approximately 0.25 degrees, for example of less than approximately 0.2 degrees, for example of less than approximately 0.1 degrees, for example of less than approximately 0.05 degrees, for example of less than approximately 0.01 degrees. In other words, they may be substantially in line with one another and substantially axially parallel.

The glass tube 202 and/or the first tube segment 202b of each transporting roller of the plurality of transporting rollers 300 may have a longitudinal extent 2021 of more than approximately 2 m (meters), for example more than approximately 2.5 m.

There follows a description of various examples of what has been described above and is represented in the figures.

Example 1 is a device (for example a transporting roller), comprising: a glass tube 202, which has a longitudinal extent of more than 2 m (meters) and a wall thickness of more than 5 mm (millimeters); a bearing arrangement 442, by means of which the glass tube 202 is mounted rotatably about an axis of rotation 111d; the glass tube 202 being joined together from a plurality of tube segments (for example comprising tube glass or formed therefrom), of which a first tube segment 202b is arranged between two second tube segments 202a, 202c; and the first tube segment 202b optionally comprising a plurality of portions 212a to 212e, the circumferential surfaces 226 of which are surfaces of rotation with respect to the axis of rotation 111d and/or are arranged coaxially (for example in line) with one another.

Example 2 is a device (for example a transporting device), comprising: a bearing arrangement 442; and a plurality (that is at least two, e.g. at least 3, e.g. at least 4, e.g. at least 5, e.g. at least 7, e.g. at least 10, e.g. at least 20, e.g. at least 50) of devices according to Example 1, of which each (e.g. at least two) transporting roller comprises two bearing portions lying opposite one another (for example end portions of the glass tube 202), on which the glass tube 202 of the transporting roller is rotatably mounted by means of the bearing arrangement 442.

Example 3 is a device (for example a transporting device), comprising: a plurality of (that is at least two, e.g. at least 3, e.g. at least 4, e.g. at least 5, e.g. at least 7, e.g. at least 10, e.g. at least 20, e.g. at least 50) transporting rollers, of which each (e.g. at least two) transporting roller comprises: a glass tube 202 mounted rotatably about an axis of rotation 111d (which for example comprises two bearing portions lying opposite one another on which the glass tube 202 is rotatably mounted); the glass tube 202 being joined together from a plurality of tube segments (for example comprising tube glass or formed therefrom) (which are for example arranged coaxially in relation to one another and) of which a first tube segment 202b is arranged between two second tube segments 202a, 202c; and the first tube segment 202b comprising a plurality of portions 212a to 212e, the circumferential surfaces 226 of which are surfaces of rotation with respect to the axis of rotation 111d and/or are arranged coaxially (for example in line); the plurality of transporting rollers providing by means of the circumferential surfaces 226 a transporting surface 111f transporting a substrate in plate form and/or strip form 112.

Example 4 is a device (for example the transporting device) according to Example 3, each (e.g. at least two) transporting roller of the plurality of transporting rollers having a longitudinal extent 2021 of more than 2 meters and/or a tube wall thickness (i.e. extent of the tube wall transverse to the axis of rotation 111d) of more than 5 millimeters.

Example 5a is a device (for example the transporting device) according to Example 3 or 4, also comprising: a bearing arrangement 442; by means of which the glass tube 202 is rotatably mounted on the bearing portions lying opposite one another.

Example 5b is a device according to one of Examples 3 to 5a, the two bearing portions comprising a first bearing portion and a second bearing portion, the two second tube segments comprising a second tube segment and a third tube segment, the second tube segment comprising the first bearing portion and the third tube segment comprising the second bearing portion.

Example 5c is a device according to one of Examples 3 to 5b, each (e.g. at least two) tube segment of the two second tube segments comprising an end portion of the glass tube 202.

Example 5d is a device according to one of Examples 3 to 5c, the bearing arrangement 442 being thermally conductive; and/or the bearing arrangement 442 having a greater thermal conductivity than the glass tube 202 and/or than at least one (i.e. precisely one or more than one, for example each) tube segment of the plurality of tube segments (for example the first tube segment 202b).

Example 6 is a device according to one of Examples 1 to 5d, the plurality of portions 212a to 212e and/or at least tube segments directly neighboring one another of the plurality of tube segments being circular-cylindrical and/or their circumferential surfaces 226 being in line with one another.

Example 7a is a device according to one of Examples 1 to 6, the glass tube 202 comprising silicon (for example silicate glass and/or quartz glass).

Example 7b is a device according to one of Examples 1 to 7a, the glass tube 202 comprising a ceramic or being formed therefrom, for example an oxidic ceramic.

Example 7c is a device according to one of Examples 1 to 7b, the glass tube 202 and/or at least one (i.e. precisely one or more than one, for example each) tube segment of the plurality of tube segments (for example the first tube segment 202b) being non-porous (i.e. free from pores).

Example 7d is a device according to one of Examples 1 to 7c, the glass tube 202 and/or at least one (i.e. precisely one or more than one, for example each) tube segment of the plurality of tube segments (for example the first tube segment 202b) being thermally insulating.

Example 8 is a device according to one of Examples 1 to 7d, the plurality of tube segments being connected to one another in a material-bonded (e.g., firmly bonded and/or monolithically bonded) manner, for example welded and/or by means of a weld seam.

Example 9 is a device according to one of Examples 1 to 8, the circumferential surfaces 226 having a greater roughness and/or a greater outer diameter than a circumferential surface 226 of the two second tube segments.

Example 10 is a device according to one of Examples 1 to 9, each (e.g. at least two) bearing portion of the bearing portions having an axially extending through-opening.

Example 11 is a device according to one of Examples 1 to 10, each (e.g. at least two) bearing portion of the bearing portions being open in the axial direction of the glass tube 202 for receiving a rotary bearing in it.

Example 12 is a device according to one of Examples 1 to 11, also comprising: two rotary bearings, of which each (e.g. at least two) rotary bearing is coupled to a bearing portion of the two bearing portions lying opposite one another.

Example 13 is a device according to one of Examples 1 to 12, portions directly neighboring one another of the plurality of portions 212a to 212e being at a distance from one another; and the first tube segment 202b between the portions directly neighboring one another having a smaller circumference, less roughness and/or a smaller diameter (for example outer diameter) than on the portions directly neighboring one another.

Example 14 is a device according to one of Examples 1 to 13, each (e.g. at least two) tube segment of the plurality of tube segments being formed monolithically and/or being formed from one piece.

Example 15 is a device according to one of Examples 1 to 14, the glass tube 202 and/or at least one (i.e. precisely one or more than one, for example each) tube segment of the plurality of tube segments (for example the first tube segment 202b) having an extent (for example a longitudinal extent 202l) of more than 2 m (for example of more than 2.1 m, for example of more than 2.2 m, for example of more than 2.3 m, for example of more than 2.4 m, for example of more than 2.5 m) and/or less than 3 m.

Example 16 is a device according to one of Examples 1 to 15, the glass tube 202 and/or at least one (i.e. precisely one or more than one, for example each) tube segment of the plurality of tube segments (for example the first tube segment 202b) having an outer diameter of more than 50 mm and/or less than 150 mm (for example of more than 60 mm and/or less than 120 mm, of more than 70 mm and/or less than 100 mm, for example approximately 90 mm).

Example 17a is a device according to one of Examples 1 to 16, also comprising: an axis of rotation 111d, along which the glass tube 202 is made to extend, the first tube segment having an eccentricity with respect to the second tube segments 202a, 202c with respect to the axis of rotation 111d of less than 0.5 mm (for example than 0.25 mm, for example than 0.1 mm, than 0.05 mm, than 0.02 mm, than 0.01 mm).

Example 17b is a device according to one of Examples 1 to 17a, the two second tube segments 202a, 202c being mounted rotatably about an axis of rotation 111d, the first tube segment 202b having an eccentricity with respect to the axis of rotation 111d of less than 0.5 mm (for example than 0.25 mm, for example than 0.1 mm, than 0.05 mm, than 0.02 mm, than 0.01 mm).

Example 18 is a device according to one of Examples 1 to 17b, the glass tube 202 and/or at least one (i.e. precisely one or more than one, for example each) tube segment of the plurality of tube segments being at least sectionally (e.g., in certain portions) (i.e. partially, completely or at least a portion thereof) transparent or opaque and/or having a greater transmission coefficient than absorption coefficient.

Example 19 is a device according to one of Examples 1 to 18, the glass tube 202 and/or at least one (i.e. precisely one or more than one, for example each) tube segment of the plurality of tube segments comprising at least sectionally (e.g., in certain portions) (i.e. partially, completely or at least a portion thereof) a multiplicity of pigments and/or having a greater absorption coefficient than transmission coefficient.

Example 20a is a device according to one of Examples 1 to 19, also comprising: a sleeve, which comprises a multiplicity of filaments; at least the first tube segment being arranged within the sleeve and/or lying in abutment (for example with the circumferential surfaces 226) to it.

Example 20b is a device according to Example 20a, the sleeve being thermally conductive; and/or the sleeve having a greater thermal conductivity than the glass tube 202 and/or at least one (i.e. precisely one or more than one, for example each) tube segment of the plurality of tube segments (for example the first tube segment 202b).

Example 21 is a device according to one of Examples 1 to 20b, also comprising: a driving system, which is coupled to at least one transporting roller of the plurality of transporting rollers and is configured to transmit a torque to the transporting roller and/or to produce such a torque.

Example 22 is a vacuum arrangement, comprising: a vacuum chamber; and a device (for example a transporting device) according to one of Examples 1 to 21, the transporting roller(s) and/or the transporting surface 111f of which is arranged within the vacuum chamber.

Example 23 is a vacuum arrangement according to Example 22, also comprising: a heating device, which is configured for emitting heat radiation in the direction of the transporting surface 111f.

Example 24 is a method for operating a device according to one of Examples 1 to 23, the method comprising: transporting at least one substrate 112 by means of the device (for example the transporting device) along a transporting path and a transporting surface 111f of the device, the at least one substrate 112 being supported and/or deflected by means of the circumferential surfaces 226; and optionally processing the at least one substrate 112.

Example 25 is a method according to Example 24, the processing comprising: irradiating the at least one substrate 112 with heat radiation.

Example 26 is a method according to Example 24 or 25, the at least one substrate 112 comprising two substrates 112, the two substrates 112 being arranged next to one another for transporting, the two substrates 112 being at a distance from one another along one direction, so that a gap is made to extend between them along the direction, the direction being parallel to the transporting surface 111f and transverse to the transporting path.

Example 27 is the use of a glass tube 202, which is joined together from at least three tube segments, for transporting a substrate in plate form and/or strip form 112 on the glass tube 202.

Example 28 is the use according to Example 27, the glass tube 202 being part of a device according to one of Examples 1 to 20b.

What claimed is:

1. A transporting device, comprising:
   a plurality of transporting rollers, of which at least two transporting rollers comprise:
      a glass tube mounted rotatably about an axis of rotation;
      the glass tube being joined together from a plurality of tube segments, a first tube segment of which is arranged between two second tube segments; and
      the first tube segment having a plurality of portions, circumferential surfaces of which are surfaces of revolution with respect to the axis of rotation and/or are arranged coaxially;
   the plurality of transporting rollers providing by means of the circumferential surfaces a transporting surface for transporting a substrate along the transporting surface.

2. The transporting device as claimed in claim 1, wherein the at least two transporting rollers of the plurality of transporting rollers have a longitudinal extent of more than 2 meters and/or a tube wall thickness of more than 5 millimeters.

3. The transporting device as claimed in either of claim 1, the plurality of portions being circular-cylindrical and/or their circumferential surfaces being aligned with one another.

4. The transporting device as claimed in claim 1, the glass tube comprising at least silicon.

5. The transporting device as claimed in claim 1, the plurality of tube segments being connected to one another in a material-bonded manner.

6. The transporting device as claimed in claim 1, the circumferential surfaces having a greater roughness and/or a greater outer diameter than a circumferential surface of the two second tube segments.

7. The transporting device as claimed in claim 1, the plurality of portions being at a distance from one another; and the first tube segment between the plurality of portions having a smaller circumference and/or less roughness than on the plurality of portions.

8. The transporting device as claimed in claim 1, the first tube segment having an eccentricity with respect to the second tube segments of less than 0.5 mm.

9. The transporting device as claimed in claim 1, the glass tube being at least sectionally transparent or opaque and/or having a greater transmission coefficient than absorption coefficient.

10. The transporting device as claimed in claim 1, the glass tube comprising at least sectionally a multiplicity of pigments and/or having a greater absorption coefficient than transmission coefficient.

11. The transporting device as claimed in claim 1, further comprising:
a bearing arrangement, by means of which the glass tube is mounted rotatably about the axis of rotation.

12. The transporting device as claimed in claim 1, wherein the glass tube has an outer diameter of more than 50 mm.

13. The transporting device as claimed in claim 1, further comprising:
a sleeve, which comprises a multiplicity of filaments; at least the first tube segment being arranged within the sleeve and/or lying in abutment to it.

14. A vacuum arrangement, comprising:
a vacuum chamber; and
a transporting device as claimed in claim 1, the transporting surface of which is arranged within the vacuum chamber and/or runs through it.

15. The vacuum arrangement, as claimed in claim 14, further comprising:
a heating device, which is configured to emit heat radiation into the direction of the transporting surface.

16. A transporting roller, comprising:
a glass tube, which has a longitudinal extent of more than 2 meters and a tube wall thickness of more than 5 millimeters;
a bearing arrangement, by means of which the glass tube is mounted rotatably about an axis of rotation;
the glass tube being joined together from a plurality of tube segments, of which a first tube segment is arranged between two second tube segments; and
the first tube segment having a plurality of portions, circumferential surfaces of which are surfaces of rotation with respect to the axis of rotation and/or are arranged coaxially.

17. The transporting roller as claimed in claim 16, the circumferential surfaces having a greater roughness and/or a greater outer diameter than a circumferential surface of the two second tube segments.

18. The transporting roller as claimed in claim 16, the plurality of portions being at a distance from one another; and
the first tube segment between the plurality of portions having a smaller circumference and/or less roughness than on the plurality of portions.

19. The transporting roller as claimed in claim 16, the first tube segment having an eccentricity with respect to the second tube segments of less than 0.5 mm.

20. The transporting roller as claimed in claim 16, the glass tube being at least sectionally transparent or opaque and/or having a greater transmission coefficient than absorption coefficient.

* * * * *